United States Patent
Schwalm et al.

(10) Patent No.: US 8,193,279 B2
(45) Date of Patent: Jun. 5, 2012

(54) FLEXIBLE, RADIATION-CURABLE COATING COMPOSITIONS

(75) Inventors: Reinhold Schwalm, Wachenheim (DE); Klaus Menzel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 330 days.

(21) Appl. No.: 12/663,721

(22) PCT Filed: Jun. 18, 2008

(86) PCT No.: PCT/EP2008/057694
§ 371 (c)(1),
(2), (4) Date: Dec. 9, 2009

(87) PCT Pub. No.: WO2008/155352
PCT Pub. Date: Dec. 24, 2008

(65) Prior Publication Data
US 2010/0168320 A1 Jul. 1, 2010

(30) Foreign Application Priority Data
Jun. 21, 2007 (EP) .................................. 07110742

(51) Int. Cl.
*C08L 39/00* (2006.01)
*B29D 11/00* (2006.01)
*B01F 3/04* (2006.01)
*B32B 27/00* (2006.01)
*B32B 9/04* (2006.01)
*D02G 3/00* (2006.01)

(52) U.S. Cl. ........ 524/555; 522/173; 522/178; 522/151; 428/423.1; 428/411.1; 428/378; 428/383

(58) Field of Classification Search .................. 524/555; 522/178, 173, 151; 428/423.1, 411.1, 378, 428/383
See application file for complete search history.

(56) References Cited

U.S. PATENT DOCUMENTS

| | | | |
|---|---|---|---|
| 4,129,667 A | 12/1978 | Lorenz et al. | |
| 4,135,007 A | 1/1979 | Lorenz et al. | |
| 4,153,778 A | 5/1979 | Park et al. | |
| 4,309,526 A * | 1/1982 | Baccei | 528/75 |
| 4,596,678 A | 6/1986 | Merger et al. | |
| 4,596,679 A | 6/1986 | Hellbach et al. | |
| 5,087,739 A | 2/1992 | Bohmholdt et al. | |
| 6,458,459 B1 * | 10/2002 | Schwalm et al. | 428/423.1 |
| 2002/0058146 A1 | 5/2002 | Schwalm et al. | |
| 2003/0100627 A1 | 5/2003 | Bishop et al. | |
| 2003/0149127 A1 | 8/2003 | Jansen et al. | |
| 2006/0009589 A1 | 1/2006 | Haering et al. | |
| 2007/0066704 A1 | 3/2007 | Schwalm et al. | |

FOREIGN PATENT DOCUMENTS

| | | |
|---|---|---|
| DE | 197 39 970 | 3/1999 |
| DE | 198 26 712 | 12/1999 |
| DE | 199 13 353 | 9/2000 |
| DE | 199 40 313 | 3/2001 |
| DE | 199 57 900 | 6/2001 |
| EP | 0 126 299 | 11/1984 |
| EP | 0 126 300 | 11/1984 |
| EP | 0 355 443 | 2/1990 |
| EP | 1678094 | 7/2006 |
| JP | 62 54710 | 3/1987 |
| JP | 1 216837 | 8/1989 |
| WO | 98 33761 | 8/1998 |
| WO | 2005 035460 | 4/2005 |
| WO | 2006 005491 | 1/2006 |

OTHER PUBLICATIONS

U.S. Appl. No. 12/665,418, filed Dec. 18, 2009, Schwalm, et al.
Valet A., "Light stabilization of radiation cured coatings", Polymers Paint Colour Journal, vol. 182, No. 4311, pp. 406-411, Jul. 22, 1992.
Weikard, J. et al., "UV-cured and elastomeric coatings—a contradiction?" © RADTECH e/5 2004 Technical Proceedings, Total 8 pages, (2004).
U.S. Appl. No. 13/264,121, filed Oct. 12, 2011, Schwalm, et al.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The present invention relates to new, radiation-curable coating compositions featuring high flexibility.

17 Claims, No Drawings

FLEXIBLE, RADIATION-CURABLE COATING COMPOSITIONS

The present invention relates to new, radiation-curable coating compositions featuring high flexibility.

Radiation-curable compositions have acquired broad application in the art, more particularly as high-value coating materials for surfaces. Radiation-curable compositions are preparations which comprise ethylenically unsaturated polymers or prepolymers and which are cured, if appropriate after a physical drying step, by exposure to high-energy radiation, as for example by irradiation with UV light or by irradiation with high-energy electrons (electron radiation).

A. Valet in Polymers Paint Color Journal, 182 (1992), 406-411 describes the use of UV absorbers and free-radical scavengers in radiation-curable coating materials for exterior applications, for the purpose of enhancing the weathering stability.

U.S. Pat. No. 4,153,778 describes urethane acrylate oligomers which comprise a polytetramethylene oxide-diol in copolymerized form, and their use as coatings, binders, and adhesives, which may comprise further components, such as ethylenically unsaturated monomers, for example.

JP-A-62054710 describes a urethane acrylate composition which comprises a urethane acrylate having a polyalcohol group in the polymer chain and a further polymerizable monomer, such as styrene or methyl methacrylate.

JP-A-01216837 describes film coatings having good scratch resistance, impact resistance, and abrasion resistance, produced using a urethane acrylate oligomer based on a diol having a number-average molecular weight of 200 to 4000.

U.S. Pat. No. 4,129,667 describes radiation-curable coating materials comprising urethane acrylate oligomer and a UV absorber. Urethane acrylates used may contain repeating units derived from polytetrahydrofuran. The coating materials, furthermore, may additionally contain monomers copolymerizable with the urethane acrylate, such as monoesters, diesters, and higher esters of acrylic acid and methacrylic acid.

U.S. Pat. No. 4,135,007 has a disclosure content comparable with that of U.S. Pat. No. 4,129,667.

DE-A-199 40 313 describes a process for producing scratch-resistant and weathering-stable coatings that applies a liquid, UV-curable coating material based on aliphatic urethane (meth)acrylate prepolymers to a target substrate and then cures the coating while the latter is still liquid by means of UV radiation in the extensive absence of oxygen.

DE-A-197 39 970 describes radiation-curable compositions which comprise at least one prepolymer, comprising aliphatic urethane groups, and at least one monofunctional ester of an α,β-ethylenically saturated carboxylic acid with a monofunctional alkanol that contains as a structural element at least one saturated 5- or 6-membered carbocycle or a corresponding heterocycle having one or two oxygen atoms in the ring.

In RadTech e|5, 2004 Technical Proceedings, J. Weikard, W. Fischer, E. Lühmann, and d. Rappen describe the influence of different polymeric diols on the elasticity of urethane acrylates; namely pure polyethers, polyesters with short ether segments, polyesters, polyesterpolycarbonates, and polycarbonates. The nature of these individual units is not disclosed.

WO 2005/035460 A1 describes mixtures of difunctional aliphatic urethane (meth)acrylates based on polyTHF and on reactive diluents which carry a heterocycle.

Although the surface properties of the systems described therein are already good, higher levels of hardness and flexibility in the resulting coatings would nevertheless be desirable.

It was an object of the present invention to develop radiation-curable coating compositions which combine good hardness with high flexibility. The yellowing proclivity of these coatings ought to be low, so making them particularly suitable for exterior applications.

This object has been achieved by means of radiation-curable coating compositions comprising
at least one (cyclo)aliphatic urethane (meth)acrylate (A) having two ethylenically unsaturated double bonds per molecule, comprising as a synthesis component at least one polytetrahydrofurandiol, and containing at least one moiety

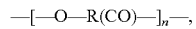

in which
R is a divalent aliphatic or cycloaliphatic radical having at least one carbon atom and
n is a positive integer which is at least 2, and
at least one monoethylenically unsaturated reactive diluent (B) which contains at least one cycloaliphatic or heterocyclic group.

As compared with the comparable systems known from WO 2005/035460 A1, these coating compositions of the invention exhibit improved hardness and flexibility, which is reflected particularly in an increased breaking elongation.

The coating compositions of the invention comprise at least one, 1 to 3 for example, 1 to 2 with preference, and with particular preference precisely one (cyclo)aliphatic urethane (meth)acrylate (A).

These (cyclo)aliphatic urethane (meth)acrylates (A) are synthesized from
at least one diisocyanate (a1),
at least one polytetrahydrofurandiol (a2) and
at least one compound (a3) having precisely one isocyanate-reactive group and precisely one free-radically polymerizable group.

Free-radically polymerizable groups in the sense of this text are vinyl ethers, acrylate and methacrylate groups, preferably acrylate and methacrylate groups, and more preferably acrylate groups.

The moiety —[—O—R—(CO)—]$_n$— may be comprised in component (a2) and/or in component (a3) and/or may be comprised as a separate component (a4). All that is indicated here is the repeating unit; in the urethane (meth)acrylate (A) this moiety is incorporated in the following form: —[—O—R—(CO)—]$_n$—O—, i.e., the terminal carbonyl group of the repeating unit is joined to a further oxa moiety, and the terminal oxa moiety of the repeating unit is joined to a further carbonyl group.

The moiety —[—O—R—(CO)—]$_n$— is preferably part of component (a2) and/or (a3), more preferably part either of component (a2) or (a3), and very preferably part of component (a2).

The moiety —[—O—R—(CO)—]$_n$— may occur one or more times, one to five times for example, one to four times for preference, and more preferably one to two times in the urethane (meth)acrylate (A). In this case, of course, the value of n may be different for each moiety.

Component (a1) is at least one, one to three for example, one to two for preference, and more preferably precisely one (cyclo)aliphatic diisocyanate.

The term "(cyclo)aliphatic diisocyanates" refers collectively to aliphatic and cycloaliphatic diisocyanates.

Cycloaliphatic isocyanates are those which comprise at least one cycloaliphatic ring system.

Aliphatic isocyanates are those which comprise exclusively linear or branched chains, in other words acyclic compounds.

Isocyanates which contain aromatic ring systems are less preferred in accordance with the invention, since in daylight they lead in general to yellowing of the resulting coatings.

Preferred compounds (a1) are cycloaliphatic diisocyanates.

The average NCO functionality of such a compound is generally 2, 1.8 to 2.2 for example, from 1.9 to 2.1 for preference, and more preferably 1.95 to 2.05. Values which deviate from 2.0 may come about, for example, through oligomer formation on the part of the diisocyanates or through loss of NCO groups as a result, for example, of atmospheric moisture.

The isocyanate group content, calculated as NCO=42 g/mol, is generally from 5% to 25% by weight.

The diisocyanates are preferably isocyanates having 4 to 20 C atoms. Examples of typical diisocyanates are aliphatic diisocyanates such as tetramethylene diisocyanate, 1,5-pentamethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, and cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also 3 (or 4), 8 (or 9)-bis(isocyanatomethyl)tricyclo[5.2.1.0$^{2,6}$]decane isomer mixtures.

Particular preference is given to hexamethylene diisocyanate, 1,3-bis(isocyanatomethyl)cyclohexane, isophorone diisocyanate, and 4,4'- or 2,4'-di(isocyanatocyclohexyl) methane, very particular preference to isophorone diisocyanate and 4,4'- or 2,4'-di(isocyanatocyclohexyl)methane; isophorone diisocyanate is particularly preferred.

Isophorone diisocyanate is generally in the form of a mixture, specifically a mixture of the cis and trans isomers, generally in a ratio of about 60:40 to 80:20 (w/w), preferably in a ratio of about 70:30 to 75:25, and more preferably in a ratio of about 75:25.

Dicyclohexylmethane 4,4'-diisocyanate may likewise take the form of a mixture of the various cis and trans isomers.

For the present invention it is possible to use not only those isocyanates which are obtained by phosgenating the corresponding amines but also those which are prepared without using phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as 1,6-hexamethylene diisocyanate (HDI), for example, isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethyl-cyclohexane (isophorone diisocyanate or IPDI), can be prepared by reaction of (cyclo)aliphatic diamines with, for example, urea and alcohols to form (cyclo)aliphatic biscarbamic esters and the thermal cleavage of said esters into the corresponding diisocyanates and alcohols. The synthesis takes place usually continuously in a circulation process and in the presence, if appropriate, of N-unsubstituted carbamic esters, dialkyl carbonates, and other secondary products recycled from the reaction process. Diisocyanates or polyisocyanates obtained in this way generally have a very low fraction, or even an unmeasurable fraction, of chlorinated compounds, which leads to favorable color numbers on the particle of the products.

In one embodiment of the present invention the diisocyanates (a1) have a total hydrolyzable chlorine content of less than 200 ppm, preferably of less than 120 ppm, more preferably of less than 80 ppm, very preferably of less than 50 ppm, more particularly of less than 15 ppm, and especially of less than 10 ppm. This can be measured, for example, by ASTM specification D4663-98. It will be appreciated, however, that diisocyanates (a1) having a higher chlorine content can also be used.

Component (a2) is at least one, preferably precisely one, polytetrahydrofurandiol.

Polytetrahydrofurandiol is a dihydroxy-functional polyether having the repeating unit H—[—O—CH$_2$—CH$_2$—CH$_2$—CH$_2$—]$_k$—OH, in which k is a positive integer leading to the average molar weight of the random polymer mixture. Values for k are usually between 4 and 80, preferably between 5 and 70, more preferably between 6 and 60.

The polytetrahydrofurandiol (a2) generally has a number-average molecular weight $M_n$, measured by gel permeation chromatography against polystyrene standard, in the range from about 500 to 4000, preferably 600 to 3000, more particularly 750 to 2000.

Suitable polytetrahydrofurans can be prepared, for example, by cationic polymerization of tetrahydrofuran in the presence of acidic catalysts, such as sulfuric or fluorosulfuric acid, for example. Preparation processes of this kind are known to the skilled worker. The polytetrahydrofurans in question are preferably strictly linear polytetrahydrofurans.

Component (a3) is at least one, one to three for example, one to two for preference, and more preferably precisely one compound having precisely one isocyanate-reactive group and precisely one free-radically polymerizable group.

Possible isocyanate-reactive groups are, for example, —OH, —SH, —NH$_2$, and —NHR$^1$, where R$^1$ is hydrogen or a C$_1$-C$_4$ alkyl radical such as methyl, ethyl, n-propyl, isopropyl, n-butyl, isobutyl, sec-butyl or tert-butyl, for example. Isocyanate-reactive groups may with preference be —OH, —NH$_2$ or —NHR$^1$, more preferably —OH or —NH$_2$, and very preferably —OH.

Components (a3) may for example be monoesters of α,β-unsaturated carboxylic acids, such as acrylic acid, methacrylic acid, crotonic acid, itaconic acid, fumaric acid, maleic acid, acrylamidoglycolic acid, methacrylamidoglycolic acid, or vinyl ethers, with diols which have preferably 2 to 20 C atoms and two hydroxyl groups. Examples of such diols are ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, 2-ethyl-1,3-hexanediol, 2,4-diethyl-1,3-octanediol, 2,4-diethyl-1,5-octanediol or 2-propyl-1,3-heptanediol.

Preference is given to the monoesters of acrylic acid or methacrylic acid with the diols listed.

Particular preference is given to using 2-hydroxyethyl (meth)acrylate, 2- or 3-hydroxypropyl(meth)acrylate, 1,4-butanediol mono(meth)acrylate, neopentyl glycol mono (meth)acrylate, 1,5-pentanediol mono(meth)acrylate, 1,6-hexanediol mono(meth)acrylate, and 4-hydroxybutyl vinyl ether.

Very particular preference is given to 2-hydroxyethyl acrylate, 2-hydroxyethyl methacrylate, 2- or 3-hydroxypropyl acrylate, and 1,4-butanediol monoacrylate.

Particular preference is given to 2-hydroxyethyl acrylate, 2-hydroxyethyl methacrylate, and 2-hydroxypropyl acrylate, especially 2-hydroxyethyl acrylate.

Essential in accordance with the invention is the presence of at least one moiety —[—O—R—(CO)—]$_n$— in the urethane (meth)acrylate (A).

This can be implemented, as set out above, through incorporation of a component (a4).

Here

R is a divalent aliphatic or cycloaliphatic radical having at least one carbon atom, preferably 2 to 20, more preferably 2 to 10, very preferably 3 to 6 carbon atoms.

Aliphatic radicals R are, for example, linear or branched alkylene, e.g., methylene, 1,2-ethylene, 1,2- or 1,3-propylene, 1,2-, 1,3- or 1,4-butylene, 1,1-dimethyl-1,2-ethylene or 1,2-dimethyl-1,2-ethylene, 1,5-pentylene, 1,6-hexylene, 1,8-octylene, 1,10-decylene, or 1,12-dodecylene. Preference is given to 1,2-ethylene, 1,2- or 1,3-propylene, 1,4-butylene, and 1,5-pentylene, particular preference to 1,5-pentylene.

Conceivable, though less preferred, are cycloaliphatic radicals, examples being cyclopropylene, cyclopentylene, cyclohexylene, cyclooctylene, and cyclododecylene.

Furthermore, n is a positive integer which is at least 2, preferably 2 to 15, more preferably 3 to 12, and very preferably 4 to 10.

A component (a4) of this kind may preferably be lactone-based polyesterdiols, which are homopolymers or copolymers of lactones, preferably hydroxyl-terminated adducts of lactones, with suitable difunctional starter molecules. Suitable lactones are preferably those deriving from compounds of the general formula HO—R—COOH, preferably HO—(CH$_2$)$_z$—COOH, where z is a number from 1 to 20 and where one or more H atoms of a methylene unit may also have been substituted by a C$_1$ to C$_4$ alkyl radical.

Examples are ε-caprolactone, gamma-caprolactone, β-propiolactone, gamma-butyrolactone, 2-acetyl-gamma-butyrolactone, gamma-valerolactone, delta-valerolactone, methyl-ε-caprolactone, and pivalolactone, and also mixtures thereof. Examples of suitable starter components are the low molecular mass dihydric alcohols set out above and (a3). The corresponding polymers of ε-caprolactone are particularly preferred. Lower polyesterdiols or polyetherdiols as well can be used as starters for preparing the lactone polymers. In lieu of the polymers of lactones it is also possible to employ the corresponding, chemically equivalent polycondensates of the hydroxycarboxylic acids corresponding to the lactones.

As already set out above, however, the moiety —[—O—R—(CO)—]$_n$— may additionally or alternatively be introduced into the urethane (meth)acrylate via component (a3).

This can be done, for example, by esterifying a polyester (a4) with (meth)acrylic acid or transesterifying it with a (meth)acrylic ester. With preference, however, the aforementioned compounds (a3), more preferably hydroxyalkyl compounds, very preferably hydroxyalkyl(meth)acrylates, are reacted with one of the lactones set out above or with the hydroxycarboxylic acid corresponding to the lactones. In this way compounds (a3) are obtained which already comprise a moiety —[—O—R—(CO)—]$_n$—.

Preference is given in this case to compounds (a31)

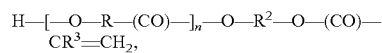

in which

R$^2$ is linear or branched alkylene, preferably alkylene having two to six carbon atoms, examples being 1,2-ethylene, 1,2- or 1,3-propylene, 1,2-, 1,3- or 1,4-butylene, 1,1-dimethyl-1,2-ethylene, 1,2-dimethyl-1,2-ethylene, 1,5-pentylene, 1,6-hexylene, 1,8-octylene, 1,10-decylene or 1,12-dodecylene, preferably 1,2-ethylene, 1,2-propylene or 1,4-butylene, more preferably 1,2-ethylene or 1,2-propylene, and R$^3$ is hydrogen or methyl.

One preferred embodiment of the present invention, however, comprises modifying the polytetrahydrofurandiol (a2) with at least one moiety —[—O—R—(CO)]$_n$—.

This is done by reacting the compounds (a2) set out above with one of the lactones set out above or with the hydroxycarboxylic acid corresponding to the lactones.

This can be done thermally, for example, or under catalysis, for example, with acids or Lewis acids, such as organotin compounds, an example being dibutyltin dilaurate. The reaction temperatures lie preferably between 80° C. and 120° C.

In this way, polytetrahydrofurandiols are obtained which contain moieties —[—O—R—(CO)—]$_n$— and which may have, for example, the following construction:

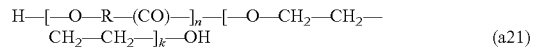

or

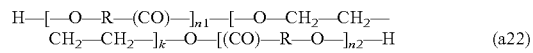

in which n1+n2=n.

These modified polytetrahydrofurandiols (a21) or (a22) generally have a number-average molecular weight M$_n$ in the range from about 700 to 5000, preferably 750 to 4000, more particularly 1000 to 2500.

Based on 100 mol % of NCO groups in (a1), the structure of the urethane (meth)acrylates (A) is generally as follows:

(a2) 25 to 75 mol %, preferably 30 to 70, more preferably 40 to 60, very preferably 45 to 55, and in particular 50 mol %, based on hydroxyl groups, (a3) 25 to 75 mol %, preferably 30 to 70, more preferably 40 to 60, very preferably 45 to 55, and in particular 50 mol %, based on isocyanate-reactive groups, (a4) 0 to 30 mol %, preferably 0 to 25, more preferably 0 to 15, very preferably 0 to 10, and in particular 0 mol %, based on hydroxyl groups, with the proviso that the sum always makes 100 mol %.

The compounds (A) preferably have a double-bond density of between 0.3 and 1.6 mol/kg.

The urethane (meth)acrylate (A) is generally prepared by mixing the components in any order, if appropriate at elevated temperature.

Preferably in this case the diisocyanate (a1) is introduced as an initial charge, if appropriate in a solvent, and the polytetrahydrofurandiol (a2) is added to this initial charge, preferably in two or more steps. If a compound (a4) is to be incorporated, it can be added to the reaction mixture together with the polytetrahydrofurandiol (a2), or after the end of the reaction of (a1) and (a2). When all or predominantly all of the isocyanate-reactive groups in (a2) have been consumed by reaction, meaning at least 60%, preferably at least 75%, more preferably at least 85%, very preferably at least 90%, and in particular at least 95%, finally, compound (a3) is added and the reaction is taken to completion, to the point where the reaction mixture no longer contains substantially any free NCO groups. This means that the NCO content of the reaction mixture is below 1%, preferably below 0.75%, more preferably below 0.5%, very preferably below 0.25%, and more particularly below 0.1% by weight.

It is also possible, though less preferred, to add all of the components having isocyanate-reactive groups to the compound (a1).

In general the reaction is conducted at temperatures between 5 and 100° C., preferably between 20 to 90° C., and more preferably between 40 and 80° C., and in particular between 60 and 80° C.

During the preparation of the urethane (meth)acrylate it is preferred to operate under anhydrous conditions.

Anhydrous here means that the water content of the reaction system is not more than 5%, preferably not more than 3%, and with particular preference not more than 1%, very preferably not more than 0.75%, and in particular not more than 0.5% by weight.

The reaction is preferably conducted in the presence of at least one oxygen-containing gas, e.g., air or air/nitrogen mixtures, or mixtures of oxygen or of an oxygen-containing gas with a gas which is inert under the reaction conditions, these mixtures having an oxygen content of less than 15%, preferably less than 12%, more preferably less than 10%, very preferably less than 8%, and in particular less than 6% by volume.

To stabilize the free-radically polymerizable compounds it is preferred to add 0.001% to 2% by weight, more particularly 0.005% to 1.0% by weight, of polymerization inhibitors to the reaction. These are the typical compounds suitable for hindering free-radical polymerization, examples being hydroquinones or hydroquinone monoalkyl ethers, 2,6-di-tert-butylphenols, such as 2,6-di-tert-butylcresol, nitrosamines, phenothiazines or phosphorous esters.

The reaction can also be conducted in the presence of an inert solvent, acetone, isobutyl methyl ketone, toluene, xylene, butyl acetate, methoxypropyl acetate or ethoxyethyl acetate for example. Preferably, though, the reaction is conducted in the absence of a solvent or in the presence of the compound (B) as solvent.

The reaction may take place thermally or with catalysis. Typical catalysts for a reaction of this kind are organozinc compounds, such as zinc acetylacetonate or zinc 2-ethylcaproate, or a tetraalkylammonium compound, such as N,N,N-trimethyl-N-2-hydroxypropylammonium hydroxide or such as N,N,N-trimethyl-N-2-hydroxypropylammonium 2-ethylhexanoate, or organotin compounds, such as dibutyltin dilaurate.

The monoethylenically unsaturated reactive diluent (B) can be a compound (B1), comprising at least one cycloaliphatic group, or a compound (B2), comprising at least one heterocyclic group.

Compounds (B1) are esters of (meth)acrylic acid with cycloalkanols or bicycloalkanols, the cycloalkanol or bicycloalkanol having from 3 to 20 carbon atoms, preferably 5 to 10 carbon atoms, and being substitutable if appropriate by $C_1$ to $C_4$ alkyl.

Examples of cycloalkanol and bicycloalkanol are cyclopentanol, cyclohexanol, cyclooctanol, cyclododecanol, 4-methylcyclohexanol, 4-isopropylcyclohexanol, 4-tert-butylcyclohexanol (preferably cis-configured), dihydrodicyclopentadienyl alcohol, isoborneol, and norbornyl alcohol. Preference is given to isoborneol, cyclohexanol, and 4-tert-butylcyclohexanol.

As component (B2) it is possible in principle to use all monofunctional esters of α,β-ethylenically unsaturated carboxylic acids with a monofunctional alkanol which has as a structural element at least one saturated 5- or 6-membered heterocycle having one or two oxygen atoms in the ring. Preferably component (B) derives from acrylic acid or methacrylic acid. Examples of suitable compounds of component (B2) comprise compounds of the general formula (I)

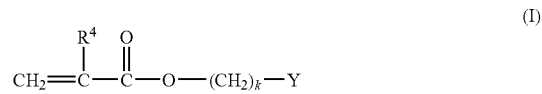

(I)

in which
$R^4$ is selected from H and $CH_3$ and more particularly is H,
k is a number from 0 to 4 and more particularly 0 or 1, and
Y is a 5- or 6-membered saturated heterocycle having one or two oxygen atoms, the heterocycle being substituted if appropriate by $C_1$-$C_4$ alkyl, e.g., methyl, ethyl, n-propyl, isopropyl, n-butyl, 2-butyl, isobutyl or tert-butyl.

Preferably the 5- or 6-membered saturated heterocycle derives from tetrahydrofuran, tetrahydropyran, 1,3-dioxolane or 1,3- or 1,4-dioxane.

Component (B2) is selected with particular preference from trimethylolpropane monoformal acrylate, glycerol monoformal acrylate, 4-tetrahydropyranyl acrylate, isobornyl acrylate, 2-tetrahydropyranylmethyl acrylate, tetrahydrofurfuryl acrylate, and mixtures thereof. As component (B2) it is very particularly preferred to use trimethylolpropane monoformal acrylate or isobornyl acrylate.

Furthermore it is possible as a further constituent (C) to use another polyfunctional polymerizable compound different than compounds (A) or (B).

Polyfunctional polymerizable compounds are those having more than one, preferably having at least two, free-radically polymerizable group(s).

Polyfunctional polymerizable compounds are preferably polyfunctional (meth)acrylates which carry more than 1, preferably 2-10, more preferably 2-6, very preferably 2-4, and more particularly 2-3 (meth)acrylate groups, preferably acrylate groups.

These may be, for example, esters of (meth)acrylic acid with polyalcohols having a corresponding functionality of at least two.

Polyalcohols of this kind are suitably, for example, at least dihydric polyols, polyetherols or polyesterols, or polyacrylate polyols, having an average OH functionality of at least 2, preferably 3 to 10.

Examples of polyfunctional polymerizable compounds are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3- or 1,4-cyclohexanediol diacrylate, trimethylolpropane triacrylate, ditrimethylolpropane pentaacrylate or hexaacrylate, pentaerythritol triacrylate or tetraacrylate, glycerol diacrylate or triacrylate, and also diacrylates and polyacrylates of sugar alcohols, such as of sorbitol, mannitol, diglycerol, threitol, erythritol, adonitol (ribitol), arabitol (lyxitol), xylitol, dulcitol (galactitol), maltitol or isomalt, for example, or of polyesterpolyols, polyetherols, poly-1,3-propanediol having a molar mass between 134 and 1178, polyethylene glycol having a molar mass between 106 and 898, and also epoxy(meth)acrylates, urethane (meth)acrylates or polycarbonate (meth)acrylates.

Further examples are (meth)acrylates of compounds of the formula (IIa) to (IId),

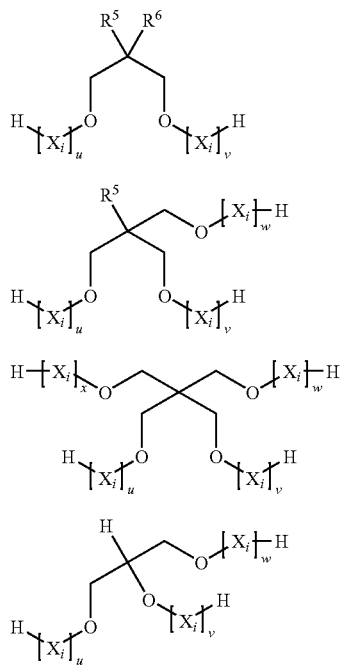

in which
R⁵ and R⁶ independently of one another are hydrogen or are $C_1$-$C_{18}$ alkyl substituted if appropriate by aryl, alkyl, aryloxy, alkyloxy, heteroatoms and/or heterocycles,
u, v, w, and x independently of one another are each an integer from 1 to 10, preferably 1 to 5, and more preferably 1 to 3, and
each $X_i$, for i=1 to u, 1 to v, 1 to w, and 1 to x, may be selected independently of the others from the group —CH₂—CH₂—O—, —CH₂—CH(CH₃)—O—, —CH(CH₃)—CH₂—O—, —CH₂—C(CH₃)₂—O—, —C(CH₃)₂—CH₂—O—, —CH₂—CHVin-O—, —CHVin-CH₂—O—, —CH₂—CHPh-O—, and —CHPh-CH₂—O—, preferably from the group —CH₂—CH₂—O—, —CH₂—CH(CH₃)—O—, and —CH(CH₃)—CH₂—O—, and more preferably —CH₂—CH₂—O—,
in which Ph is phenyl and Vin is vinyl.

In these definitions, $C_1$-$C_{18}$ alkyl substituted if appropriate by aryl, alkyl, aryloxy, alkyloxy, heteroatoms and/or heterocycles is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, very preferably methyl or ethyl.

The (meth)acrylates in question are preferably (meth)acrylates of singly to viginuply and with particular preference triply to decuply ethoxylated, propoxylated or mixedly ethoxylated and propoxylated, and more particularly exclusively ethoxylated, neopentyl glycol, trimethylolpropane, trimethylolethane or pentaerythritol.

Preferred polyfunctional polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, polyesterpolyol acrylates, polyetherol acrylates, and triacrylate of singly to viginuply alkoxylated, more preferably ethoxylated, trimethylolpropane.

Very particularly preferred polyfunctional polymerizable compounds are 1,4-butanediol diacrylate, 1,6-hexanediol diacrylate, trimethylolpropane triacrylate, pentaerythritol tetraacrylate, and triacrylate of singly to viginuply ethoxylated trimethylolpropane.

In one preferred embodiment it can be sensible to add at least one compound (C1) having at least one acidic group and at least one free-radically polymerizable group instead of or in addition to the polyfunctional polymerizable compound (C).

The acidic group may preferably be a carboxyl, sulfonic acid, phosphonic acid or phosphoric acid group, more preferably a carboxyl or phosphonic acid group.

This may also be taken to include groups from which acidic groups can form, examples being anhydride groups.

The compounds (C1) have for example one to three, preferably one to two, and more preferably precisely one acidic group.

The compounds (C1) have for example one to three, preferably one to two, and more preferably precisely one free-radically polymerizable group.

Examples of compounds (C1) are acrylic acid, methacrylic acid, ethacrylic acid, α-chloroacrylic acid, crotonic acid, maleic acid, maleic anhydride, vinylsulfonic acid, vinylphosphonic acid, fumaric acid, itaconic acid, citraconic acid, mesaconic acid, glutaconic acid, aconitic acid, allylsulfonic acid, sulfoethyl acrylate, sulfomethacrylate, sulfopropyl acrylate, sulfopropyl methacrylate, 2-hydroxy-3-acryloyloxypropylsulfonic acid, 2-hydroxy-3-methacryloyloxypropylsulfonic acid, allylphosphonic acid, styrenesulfonic acid, 2-acrylamido-2-methylpropanesulfonic acid, 2-acrylamido-2-methylpropanephosphonic acid, and also their amides, hydroxyalkyl esters, and amides and esters containing amino groups or ammonium groups. Preferred compounds (C1) are acrylic acid, methacrylic acid, maleic anhydride, vinylsulfonic acid, and vinylphosphonic acid; acrylic acid, methacrylic acid, and vinylphosphonic acid are particularly preferred.

The compounds (C1) generally have the effect of improved adhesion to the substrates, more particularly to metallic substrates.

The composition of the coating compositions of the invention is generally as follows:
(A) 20% to 90%, preferably 30% to 80%, and more particularly 40% to 70% by weight
(B) 10% to 80%, preferably 20% to 60%, and more particularly 30% to 50% by weight
(C) 0% to 50% and preferably 0% to 40% by weight
(C1) 0% to 10%, preferably 0.1% to 6%, more preferably 0.5% to 4% by weight,
with the proviso that the sum always amounts to 100% by weight.

Based on the sum of the compounds (A), (B), and (C), furthermore, the coating compositions of the invention may further comprise 0% to 10% by weight of at least one photoinitiator (D).

Photoinitiators (D) may for example be photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Photoinitiators contemplated are those of the kind described in WO 2006/005491 A1, page 21, line 18 to page 22, line 2 (corresponding to US 2006/0009589 A1, paragraph [0150]), which is hereby incorporated by reference as part of the present disclosure.

Also suitable are non-yellowing or low-yellowing photoinitiators of the phenylglyoxalic ester type, as described in DE-A 198 26 712, DE-A 199 13 353 or WO 98/33761.

Preferred among these photoinitiators are 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

Furthermore, based on the sum of the compounds (A), (B), and (C), the coating compositions of the invention may further comprise 0% to 10% by weight of at least one UV stabilizer (E).

Suitable stabilizers (E) comprise typical UV absorbers such as oxanilides, triazines, and benzotriazole (the latter available as Tinuvin® products from Ciba-Spezialitäten-chemie), and benzophenones.

They can be used alone or together with, based on the sum of the compounds (A), (B), and (C), 0% to 5% by weight of suitable free-radical scavengers (F), additionally, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate.

Furthermore, based on the sum of the compounds (A), (B), and (C), the coating compositions of the invention may further comprise 0% to 10% by weight of further, typical coatings additives (G).

Examples of further typical coatings additives (G) that can be used include antioxidants, activators (accelerants), fillers, pigments, dyes, antistats, flame retardants, thickeners, thixotropic agents, surface-active agents, viscosity modifiers, plasticizers or chelating agents.

In addition it is possible to add one or more thermally activable initiators, for example, potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, those thermally activable initiators which have a half-life at 80° C. of more than 100 hours, such as di-tert-butyl peroxide, cumene hydroperoxide, dicumyl peroxide, tert-butyl perbenzoate, silylated pinacols, available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd ed., Wiley & Sons, New York.

Suitable thickeners, besides free-radically (co)polymerized (co)polymers, include typical organic and inorganic thickeners such as hydroxymethylcellulose or bentonite.

Chelating agents which can be used include, for example, ethylenediamineacetic acid and the salts thereof, and also β-diketones.

Suitable filers comprise silicates, examples being silicates obtainable by hydrolysis of silicon tetrachloride, such as Aerosil® from Degussa, siliceous earth, talc, aluminum silicates, magnesium silicates, calcium carbonates, etc.

The coating compositions of the invention are suitable for coating substrates such as wood, paper, textile, leather, nonwoven, plastics surfaces, glass, ceramic, mineral building materials, such as molded cement bricks and fiber cement slabs, or coated or uncoated metals, more preferably plastics or metals, more particularly in the form of films or foils, and with particular preference metals.

The coating materials can be employed in particular in primers, surfacers, pigmented topcoat materials and clearcoat materials field of automotive refinish or large-vehicle finishing, and aircraft. Coating materials of this kind are particularly suitable for applications requiring particularly high levels of application reliability, external weathering resistance, hardness, and flexibility, such as in automotive refinish and large-vehicle finishing.

The coating compositions of the invention are especially employed as or in automotive clearcoat and topcoat material(s). Further preferred fields of use are can coating and coil coating.

Coil coating is the continuous coating of metal strips with coating materials, usually liquid coating materials. Rolled metal strips, after production, are wound up into rolls (referred to as "coils") for the purposes of storage and transport. These metal strips represent the starting material for the majority of sheetlike metallic workpieces, examples being automobile parts, bodywork parts, instrument paneling, exterior architectural paneling, ceiling paneling or window profiles, for example. For this purpose the appropriate metal sheets are shaped by means of appropriate techniques such as punching, drilling, folding, profiling and/or deep drawing. Larger components, such as automobile bodywork parts, for example, are assembled if appropriate by welding together a number of individual parts.

For the coating operation, metal strips with a thickness of 0.2 to 2 mm and a width of up to 2 m are transported at a speed of up to 200 m/min through a coil coating line, and are coated in the process. For this purpose it is possible to use, for example, cold-rolled strips of soft steels or construction-grade steels, electrolytically galvanized thin sheet, hot-dip-galvanized steel strip, or strips of aluminum or aluminum alloys. Typical lines comprise a feed station, a coil store, a cleaning and pretreatment zone, a first coating station along with baking oven and downstream cooling zone, a second coating station with oven, laminating station, and cooling, and also a coil store and winder.

Characteristic of coil coatings are thin films of the coating compositions, with a dry film thickness of usually well below 80 µm, often below 60 µm, below 50 µm, and even below 40 µm. Furthermore, the metal sheets are processed with a high throughput, which necessitates short residence times, i.e., necessitates drying at an elevated temperature following application of the coating, in order that the coating composition soon acquires load-bearing qualities.

Coating of the substrates with the coating compositions of the invention takes place in accordance with typical processes known to the skilled worker, a coating composition of the invention or a paint formulation comprising it being applied in the desired thickness to the target substrate and, if appropriate, dried. This operation may if desired be repeated one or more times. Application to a substrate may take place in a known way, as for example by spraying, troweling, knifecoating, brushing, rolling, roller coating, pouring, laminating, injection backmolding or coextruding. The coating material may also be applied electrostatically in the form of powder (powder coating materials). The coating thickness is situated generally in a range from about 3 to 1000 g/m² and preferably 10 to 200 g/m².

Further disclosed is a method of coating substrates which involves applying to the substrate a coating composition of the invention or a paint formulation comprising it, admixed if appropriate with further, typical coatings additives and thermally, chemically or radiation-curable resins, drying the applied coating if appropriate, curing it with electron beams or UV exposure under an oxygen-containing atmosphere or, preferably, under inert gas, and subjecting it to thermal treatment, if appropriate, at temperatures up to the level of the drying temperature, and thereafter at temperatures up to 160° C., preferably between 60 and 160° C., more preferably between 100 and 160° C.

Radiation curing takes place with high-energy light, UV light for example, or electron beams. Radiation curing may take place at relatively high temperatures. Preference is given in that case to a temperature above the $T_g$ of the radiation-curable binder. Radiation curing here means the free-radical polymerization of polymerizable compounds as a result of electromagnetic and/or particulate radiation, preferably UV light in the wavelength range of $\lambda=200$ to 700 nm and/or electron radiation in the range from 150 to 300 keV, and more preferably with a radiation dose of at least 80, preferably 80 to 3000 mJ/cm$^2$.

Besides radiation curing there may also be further curing mechanisms involved, examples being thermal curing, moisture curing, chemical curing and/or oxidative curing, preferably thermal and radiation curing, and more preferably radiation curing alone.

The coating materials may be applied one or more times by any of a very wide variety of spraying methods, such as compressed-air, airless or electrostatic spraying methods, using one- or two-component spraying units, or else by injecting, troweling, knifecoating, brushing, rolling, roller coating, pouring, laminating, injection backmolding or coextruding.

The coating thickness is generally in a range from about 3 to 1000 g/m$^2$ and preferably 10 to 200 g/m$^2$.

Drying and curing of the coatings take place generally under standard temperature conditions, i.e., without the coating being heated. Alternatively the mixtures of the invention can be used to produce coatings which, following application, are dried and cured at an elevated temperature, e.g., at 40-250° C., preferably 40-150° C., and more particularly at 40 to 100° C. This is limited by the thermal stability of the substrate.

Additionally disclosed is a method of coating substrates which involves applying the coating composition of the invention or paint formulations comprising it, if appropriate admixed with thermally curable resins, to the substrate, drying it, and then curing it with electron beans or UV exposure under an oxygen-containing atmosphere or, preferably, under inert gas, if appropriate at temperatures up to the level of the drying temperature.

The method of coating substrates can also be practiced by irradiating the applied coating composition of the invention, or paint formulations, first with electron beams or UV exposure, under oxygen or, preferably, under inert gas, in order to obtain preliminary curing, then carrying out thermal treatment at temperatures up to 160° C., preferably between 60 and 160° C., and subsequently completely curing with electron beams or UV exposure under oxygen or, preferably, under inert gas.

If appropriate, if a plurality of layers of the coating material are applied one on top of another, drying and/or radiation curing may take place after each coating operation.

Examples of suitable sources for the radiation cure are low-pressure, medium-pressure, and high-pressure mercury lamps, and also fluorescent tubes, pulsed lamps, metal halide lamps, electronic flash devices, which allow radiation curing without a photoinitiator, or excimer lamps. The radiation cure is accomplished by exposure to high-energy radiation, i.e., UV radiation or daylight, preferably light in the wavelength range of $\lambda=200$ to 700 nm, more preferably $\lambda=200$ to 500 nm, and very preferably $\lambda=250$ to 400 nm, or by irradiation with high-energy electrons (electron radiation; 150 to 300 keV). Examples of radiation sources used include high-pressure mercury vapor lamps, lasers, pulsed lamps (flash light), halogen lamps or excimer lamps. The radiation dose typically sufficient for crosslinking in the case of UV curing is situated in the range from 80 to 3000 mJ/cm$^2$.

It will be appreciated that it is also possible to use two or more radiation sources for the cure, two to four for example.

These sources may also each emit in different wavelength ranges.

Drying and/or thermal treatment may also take place, in addition to or instead of the thermal treatment, by means of NIR radiation, which here refers to electromagnetic radiation in the wavelength range from 760 nm to 2.5 μm, preferably from 900 to 1500 nm.

Irradiation can if appropriate also be carried out in the absence of oxygen, such as under an inert gas atmosphere. Suitable inert gases are preferably nitrogen, noble gases, carbon dioxide, or combustion gases. Furthermore, irradiation may take place with the coating composition being covered with transparent media. Examples of transparent media are polymeric films, glass or liquids, water for example. Particular preference is given to irradiation in the manner described in DE-A1 199 57 900.

It is an advantage of the present invention that, with the coating compositions of the invention, coatings are obtained which combine a high level of hardness with very good flexibility.

The examples below are intended to illustrate the present invention, but to do so without limiting it.

The % and ppm figures reported in this specification are % by weight and ppm by weight, unless indicated otherwise.

EXAMPLES

Example 1

Preparation of a Resin Based on Polytetrahydrofuran-Co-Caprolactone:

300 parts of polytetrahydrofurandiol with a molecular weight of 1000 g/mol and 68.5 parts of caprolactone were heated to 100° C., at which point 0.4 part of dibutyltin dilaurate was added. The mixture was left to react at 115° C. for 6 hours and then cooled. The result was a clear, viscose product.

61.5 parts of this product were admixed with 0.4 part of hydroquinone monomethyl ether and 1 part of 2,6-di-tert-butylcresol and heated to 60° C. Then 21.4 parts of isophorone diisocyanate were added over the course of 15 minutes and the mixture was left to react at 80-85° C. for 2 hours, after which 11.2 parts of hydroxyethyl acrylate were added dropwise over the course of 5 minutes, and the batch was left to continue reacting at the stated temperature for a further 4 hours. The NCO value thereafter had dropped to 0. The cooled product had a viscosity at room temperature (23° C.) of 332 Pas.

Example 2

The procedure of Example 1 was repeated, but adding 137 parts of caprolactone instead of 68.5 parts of caprolactone. The finished product had a viscosity at room temperature of 110 Pas.

Example 3

The procedure of Example 1 was repeated, but adding 205.5 parts of caprolactone instead of 68.5 parts of caprolactone. The finished product had a viscosity at room temperature of 105 Pas.

Example 4

The procedure of Example 1 was repeated, but adding 33.1 parts of a reaction product of hydroxyethyl acrylate with caprolactone instead of 11.2 parts of hydroxyethyl acrylate (TONE® M100, Dow Chemical). The finished product had a viscosity at room temperature of 83 Pas.

Example 5

The procedure of Example 2 was repeated, but adding 33.1 parts of a reaction product of hydroxyethyl acrylate with caprolactone instead of 11.2 parts of hydroxyethyl acrylate (TONE® M100, Dow Chemical). The finished product had a viscosity at room temperature of 74 Pas.

Example 6

The procedure of Example 3 was repeated, but adding 33.1 parts of a reaction product of hydroxyethyl acrylate with caprolactone instead of 11.2 parts of hydroxyethyl acrylate (TONE® M100, Dow Chemical). The finished product had a viscosity at room temperature of 82 Pas.

Example 7

79 parts of polytetrahydrofurandiol having a molecular weight of 1000 g/mol, 54 parts of a reaction product of caprolactone with hydroxyethyl acrylate (TONE M100, Dow Chemical), 54 parts of trimethylolpropane formal monoacrylate, 0.1 part of hydroquinone monomethyl ether, and 0.02 part of dibutyltin dilaurate were charged to a round-bottomed flask, this initial charge was heated to 60° C., and 35 parts of isophorone diisocyanate were added dropwise over 15 minutes. The mixture was left to react at 80° C. for a further 8 hours. When the NCO value had dropped to 0, the resulting product was filtered through a 50 µm filter and discharged. The resulting urethane acrylate had a viscosity of 10 Pas (at 23° C.).

Comparative Example 1

Ex 1 of EP 1678094

450 parts of polytetrahydrofurandiol having a molecular weight of 1000 g/mol, 105 parts of hydroxyethyl acrylate, 250 parts of trimethylolpropane formal monoacrylate, 0.4 part of hydroquinone monomethyl ether, and 0.1 part of dibutyltin dilaurate were charged to a round-bottomed flask, this initial charge was heated to 80° C., and 200 parts of isophorone diisocyanate were added dropwise over 30 minutes. The mixture was left to react at 80° C. for a further 5 hours. When the NCO value had dropped to 0, the resulting product was filtered through a 50 µm filter and discharged. The resulting urethane acrylate had a viscosity of 15 Pas (at 23° C.).

Preparation of Paints from the Resins of Examples 1-6

The resins prepared in accordance with Examples 1-6 were blended with 10%, 30% or 50%, respectively, of the reactive diluent tert-butylcyclohexyl acrylate, and 96 parts in each case of the paint thus produced were admixed with 4 parts of the photoinitiator 2-hydroxy-2-methyl-1-phenylpropan-1-one (Darocure® 1173, Ciba Spezialitätenchemie). The paint formulations this gave were applied to glass plates using a 120 µm box-type coating bar, and were exposed in an IST-UV belt unit at 1350 mJ/cm² in each case.

The exposed films were then removed from the glass plate and subjected to a tension-extension test. This resulted in the breaking extensions shown in Table 1, measured with a tension speed of 1 mm/min.

| Example | Reactive diluent (%) | Breaking extension (%) |
|---|---|---|
| Example 1 | 10 | 87 |
|  | 30 | 114 |
|  | 50 | 115 |
| Example 2 | 10 | 63 |
|  | 30 | 80 |
|  | 50 | 133 |
| Example 3 | 10 | 79 |
|  | 30 | 112 |
|  | 50 | 117 |
| Example 4 | 10 | 66 |
|  | 30 | 76 |
|  | 50 | 140 |
| Example 5 | 10 | 71 |
|  | 30 | 100 |
|  | 50 | 143 |
| Example 6 | 10 | 60 |
|  | 30 | 90 |
|  | 50 | 141 |

Production of Paints and Application:

4 parts of the photoinitiator 2-hydroxy-2-methyl-1-phenylpropan-1-one (Darocure® 1173, Ciba Spezialitätenchemie) were added to 96 parts of each of the urethane acrylates prepared, the components were mixed thoroughly on a roller bed for approximately 2 hours, and the paint mixture was applied using a 100 µm Erichsen box-type coating bar to glass plates or Bonder panels. The films thus applied were then exposed in a UV exposure unit from IST-Metz at 1350 mJ/cm².

The properties of the paint films were as follows:

|  | Pendulum damping (s) | Erichsen cupping (mm) | Breaking extension (%) |
|---|---|---|---|
| Example 7 | 18 | >9.5 | 89 |
| Comparative Example 1 | 9 | >9.5 | 81 |

Measuring Conditions:

Pendulum Damping: (Based on DIN 53157)

100 µm wet film thickness, exposed with a high-pressure Hg lamp, 120 W/cm; substrate distance 10 cm; belt speed 2×10 m/min; pendulum instrument according to DIN 53157 (König); reported in sec.

Erichsen Cupping: (Based on DIN 53156)

50 µm wet film thickness with wire-wound doctor blade; exposed with a high-pressure Hg lamp, 120 W/cm; substrate distance 10 cm; belt speed 2×10 m/min; Erichsen cupping according to DIN 53156; reported in mm.

The invention claimed is:

1. A radiation-curable coating composition comprising
   at least one (cyclo)aliphatic urethane (meth)acrylate (A)
      having two ethylenically unsaturated double bonds per molecule, comprising as a synthesis component at least one polytetrahydrofurandiol, and containing at least one moiety —[—O—R—(CO)—]$_n$—, wherein
R is a divalent aliphatic or cycloaliphatic radical having at least one carbon atom and
n is a positive integer which is at least 2, and
at least one monoethylenically unsaturated reactive diluent (B) which contains at least one cycloaliphatic or heterocyclic group.

2. The coating composition according to claim 1, wherein the urethane (meth)acrylate (A) is synthesized from
at least one diisocyanate (a1),
at least one polytetrahydrofurandiol (a2) and
at least one compound (a3) having precisely one isocyanate-reactive group and precisely one free-radically polymerizable group.

3. The coating composition according to claim 2, wherein the moiety —[—O—R—(CO)—]$_n$— is part of component (a2) and/or component (a3).

4. The coating composition according to claim 2, wherein component (a1) is selected from the group consisting of hexamethylene diisocyanate, 1,3-bis(isocyanatomethyl)cyclohexane, isophorone diisocyanate, and 4,4'-di(isocyanatocyclohexyl)methane and 2,4'-di(isocyanatocyclohexyl)methane.

5. The coating composition according to claim 2, wherein component (a2) has a number-average molecular weight $M_n$ in the range from 500 to 4000.

6. The coating composition according to claim 2, wherein component (a3) is selected from the group consisting of 2-hydroxyethyl (meth)acrylate, 2-hydroxypropyl (meth)acrylate, 3-hydroxypropyl (meth)acrylate, 1,4-butanediol mono(meth)acrylate, neopentyl glycol mono(meth)acrylate, 1,5-pentanediol mono(meth)acrylate, 1,6-hexanediol mono(meth)acrylate, and 4-hydroxybutyl vinyl ether.

7. The coating composition according to claim 1, wherein n is a positive integer ranging from 2 to 15.

8. The coating composition according to claim 2, wherein the moiety —[—O—R—(CO)—]$_n$— is introduced into component (a2) by reaction of a polytetrahydrofurandiol with at least one lactone and/or at least one hydroxycarboxylic acid.

9. The coating composition according to claim 2, wherein component (a2) is selected from the group consisting of H—[—O—R—(CO)—]$_n$—[—O—CH$_2$—CH$_2$—CH$_2$—CH$_2$—]$_k$—OH     (a21)

and

H—[—O—R—(CO)—]$_{n1}$—[—O—CH$_2$—CH$_2$—CH$_2$—CH$_2$—]$_k$—O—[(CO)—R—O—]$_{n2}$—H     (a22)

in which n1+n2=n.

10. The coating composition according to claim 2, wherein the moiety —[—O—R—(CO)—]$_n$— is introduced into component (a3) by reaction of a hydroxyalkyl (meth)acrylate with at least one lactone and/or at least one hydroxycarboxylic acid.

11. The coating composition according to claim 2, wherein component (a3) is a compound (a31)

H—[—O—R—(CO)—]$_n$—O—R$^2$—O—(CO)—CR$^3$=CH$_2$, in which
R$^2$ is linear or branched alkylene selected from the group consisting of 1,2-ethylene, 1,2- or 1,3-propylene, 1,2-, 1,3- or 1,4-butylene, 1,1-dimethyl-1,2-ethylene, 1,2-dimethyl-1,2-ethylene, 1,5-pentylene, 1,6-hexylene, 1,8-octylene, 1,10-decylene and 1,12-dodecylene, and
R$^3$ is hydrogen or methyl.

12. The coating composition according to claim 1, wherein reactive diluent (B) is an ester of (meth)acrylic acid with cycloalkanols or bicycloalkanols, the cycloalkanol or bicycloalkanol having from 3 to 20 carbon atoms and being substitutable optionally by $C_1$ to $C_4$ alkyl.

13. The coating composition according to claim 2, wherein reactive diluent (B) is an ester of α,β-ethylenically unsaturated carboxylic acids with a monofunctional alkanol which has as a structural element at least one saturated 5- or 6-membered heterocycle having one or two oxygen atoms in the ring.

14. The coating composition according to claim 2, wherein reactive diluent (B) is selected from the group consisting of the (meth)acrylic ester of cyclopentanol, cyclohexanol, cyclooctanol, cyclododecanol, 4-methylcyclohexanol, 4-isopropylcyclohexanol, 4-tert-butylcyclohexanol, dihydrodicyclopentadienyl alcohol, and norbornyl alcohol, and also trimethylolpropane monoformal acrylate, glycerol monoformal acrylate, 4-tetrahydropyranyl acrylate, 2-tetrahydropyranylmethyl acrylate, and tetrahydrofurfuryl acrylate.

15. A process for preparing a urethane (meth)acrylate according to claim 2, which comprises initially introducing the diisocyanate (a1), optionally in a solvent, adding the polytetrahydrofurandiol (a2) to this initial charge, and, following complete or predominant consumption by reaction of the reactive groups in (a2), adding the compound (a3) and continuing reaction until the reaction mixture no longer contains substantially any free NCO groups.

16. A coating composition according to claim 1 for coating wood, paper, textile, leather, nonwoven and plastics surfaces, glass, ceramic and mineral building materials, and coated or uncoated metals.

17. A can coating or coil coating comprising the coating composition according to claim 1.

* * * * *